United States Patent [19]
Kim et al.

[11] Patent Number: 5,818,509
[45] Date of Patent: Oct. 6, 1998

[54] LINE DRIVING SYSTEM ACCORDING TO THE CHARACTERISTIC OF A TRANSMISSION MEDIUM

[75] Inventors: Hyo Joong Kim; Yong Seob Yoon, both of Daejeon, Rep. of Korea

[73] Assignee: Electronics and Telecommunications Research Institute, Daejeon, Rep. of Korea

[21] Appl. No.: 746,979

[22] Filed: Nov. 19, 1996

[30] Foreign Application Priority Data

Dec. 20, 1995 [KR] Rep. of Korea ................. 1995-52303

[51] Int. Cl.⁶ .............................. H04N 7/10; H04N 17/00
[52] U.S. Cl. .............................. 348/6; 348/192; 375/285; 375/296
[58] Field of Search ............................... 348/6, 192, 193; 370/201; 375/227, 285, 296, 317; 333/28 R, 18; 324/73; 326/21, 29, 31; 379/1, 4, 5, 6, 394, 398, 400, 401; 455/10, 63, 65, 501, 504, 266; 371/20.4, 20.5

[56] References Cited

U.S. PATENT DOCUMENTS 3,781,703  12/1973  Duty ........................................... 330/29
4,507,793   3/1985  Adams ....................................... 375/36
5,329,243   7/1994  Tay ........................................... 330/136

Primary Examiner—Mark R. Powell
Assistant Examiner—Ronald D. House
Attorney, Agent, or Firm—Antonelli, Terry, Stout & Kraus, LLP

[57] ABSTRACT

A line driving system according to the characteristic of a transmission medium is disclosed, including: a setup signal generator for generating a setup signal; an amplifier, connected to the setup signal generator, for amplifying an entire frequency band to a constant level, and changing the setup signal and a subscriber transmission signal; a frequency compensator, connected to the amplifier, for adjusting an amplification gain of a corresponding frequency; a line connector, connected to the frequency compensator and a cable, for connecting a driving signal to a transmission line medium; a setup signal receiver for receiving the transmitted setup signal; a clamp/signal detector, connected to the setup signal receiver, for detecting a (−) directional pulse signal of the setup signal, generating a signal clamped to a reference point, calculating a value based on a clamp level, and converting the value to a voltage value; a combination/discrimination/control generator connected to the amplifier and the frequency compensator, for generating a control signal adjusting an ampliation gain according to an output signal generated from the clamp/signal detector; and a system controller connected to the setup signal receiver and the clamp signal detector, for receiving the setup signal from a counterpart, requesting a setup, controlling the combination/discrimination/control generator, and managing the start and end of a setup procedure.

3 Claims, 5 Drawing Sheets

LINE DRIVING SYSTEM ACCORDING TO THE CHARACTERISTIC OF A TRANSMISSION MEDIUM

BACKGROUND OF THE INVENTION

The present invention relates to a line driving system according to the characteristic of a transmission medium.

Recently, a subscriber network for providing a multimedia service such as a CATV (cable television), a VOD (video on demand), etc. has been studied. To accommodate the multimedia service in an interactive CATV which requires the broadband transmission and two-way communication, a VOD, etc., studies on an ADSL (asymmetric digital subscriber loop) and an HDSL (high density subscriber loop) using a copper wire medium, and an optical subscriber network using an optical fiber are making active progress. However, the subscriber network using the copper wire medium has limitations in the long-distance broadband transmission. The optical subscriber network using an optical line proposed as a method for solving this problem is also an obstacle to practical use since it is poor economy relative to a general copper wire or a coaxial medium. Therefore, a system design and a network structure for raising commercial profit have been studied. Furthermore, the subscriber transmission network of a FTTC (fiber to the curb) or HFC (hybrid fiber coaxis) structure which is a compromise between the commercial profit and the long-distance broadband transmission is being considered. Especially, in a subscriber interval, an attempt to send a broadband signal to an existing telephone line or a coaxial cable has been made. A line coding or modulating/demodulating technique is used to transmit the broadband signal by use of the copper wire. However, even if such a technique is used, a symbol rate of the signal exceeds 10M symbols/sec. When transmitting the signal using the copper wire of the telephone line etc., a transmission distance and the transmission performance are influenced by the state and length of a cable, the number of branch taps, and an installation environment. That is, for the long-distance transmission, an transmission output should be adjusted according to the characteristic of the transmission line. If the high frequency transmission is needed, a frequency corresponding to an attenuated amount in a frequency line should be compensated. In the short-distance transmission, if the transmission output is excessive, an obstacle to an electronic wave is induced to other lines, and thus the transmission performance of other lines is deteriorated.

SUMMARY OF THE INVENTION

It is an object of the present invention to provide a line driving system according to the characteristic of a transmission medium which maximizes a transmission distance within a given environment and simultaneously prevents an increases in the electronic wave emission of a line caused by an excessive output, by automatically adjusting a transmission output and a frequency suitable for the characteristic of a transmission line of a signal transmitted through a telephone line or a coaxial cable so as to have the optimal transmission performance.

In accordance with one aspect of the present invention, there is provided a line driving system including: a setup signal generator for generating a setup signal; an amplifier connected to the setup signal generator, for amplifying an entire frequency band to a constant level, and changing the setup signal and a subscriber transmission signal; a frequency compensator connected to the amplifier, for adjusting an amplification gain of a corresponding frequency; a line connector connected to the frequency compensator and a cable, for connecting a driving signal to a transmission line medium; a setup signal receiver for receiving the transmitted setup signal; a clamp/signal detector connected to the setup signal receiver, for detecting a (−) directional pulse signal of the setup signal, generating a signal clamped to a reference point, calculating a value based on a clamp level, and converting the value to a voltage value; a combination/discrimination/control generator connected to the amplifier and the frequency compensator, for generating a control signal adjusting an amplification gain according to an output signal generated from the clamp/signal detector; and a system controller connected to the setup signal receiver and the clamp signal detector, for receiving the setup signal from a counterpart, requesting a setup, controlling the combination/discrimination/control generator, and managing the start and end of a setup procedure.

BRIEF DESCRIPTION OF THE ATTACHED DRAWINGS

DETAILED DESCRIPTION OF PREFERRED EMBODIMENT

Figure 1:
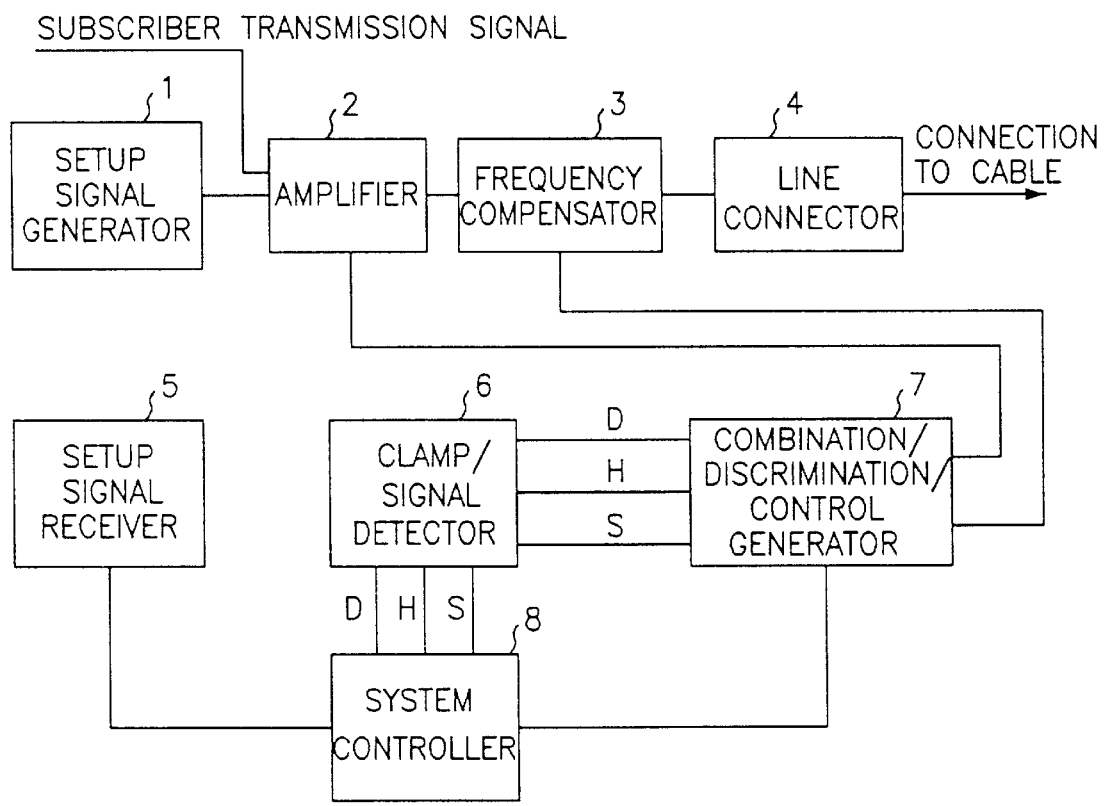
FIG. 1 is a block diagram of a line driving system according to the present invention.

Referring to FIG. 1, a reference numeral 1 indicates a setup signal generator, 2 an amplifier, 3 a frequency compensator, 4 a line connector, 5 a setup signal receiver, 6 clamp/signal detector, 7 a combination/discrimination/control generator, and 8 a system controller.

The setup signal generator 1 generates a setup signal. The amplifier 2 connected to the setup signal generator 1 amplifies an entire frequency band to a constant level by a control signal, and changes the setup signal and a subscriber transmission signal. The frequency compensator 3 connected to the amplifier 2 adjusts an amplification gain of a corresponding frequency by a control signal. The line connector 4 connected to the frequency compensator 3 is coupled to a cable to connect a driving signal to a transmission line medium.

The setup signal receiver 5 receives the setup signal. The clamp/signal detector 6 connected to the setup signal receiver 5 detects a (−) directional pulse signal of the setup signal, and generates a signal clamped to a reference point. The clamp/signal detector 6 also calculates, on the basis of the clamp level, an H value indicating an amplitude of an attenuated state while the setup signal passes through a line toward a (+) directional amplitude, a D value indicating a rise time generated while the setup signal passes through the line, and a S value indicating a sag generated while the setup signal passes through the line, and converts the calculated values to voltage values.

The combination/discrimination/control generator 7 connected to the amplifier 2 and the frequency compensator 3 receives the H, D and S values from the clamp/signal detector 6, generates a signal for controlling the ampliation gain according to the H value, and generates a signal for controlling the ampliation gain of a corresponding frequency band according to the D and S values. If the H value is less than a specified level, the combination/discrimination/control generator 7 generates the control signal for increasing the amplification gain in proportion to the small degree of the H value. If the D value is large, the combination/discrimination/control generator 7 judges that a high frequency transmission characteristic is poor and generates a compensation signal. The S value indicates a low frequency transmission characteristic. If the S value is large, the combination/discrimination/control generator 7 generates the control signal for increasing the amplification gain of a low frequency band. The system controller 8 receives the setup signal from a counterpart, requests the setup, and controls the combination/discrimination/control generator 7. The system controller 8 starts and ends a setup procedure.

Figure 2A:
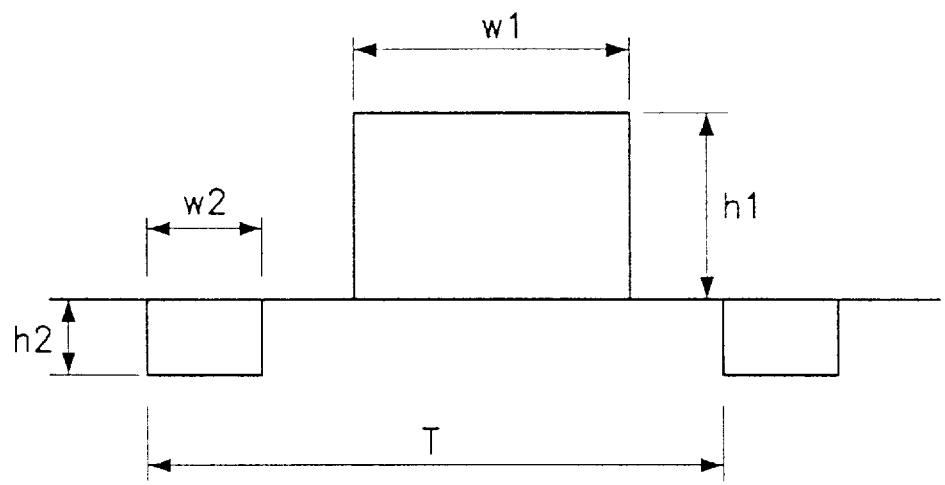
FIG. 2A shows a setup signal generated from a setup signal generator of the line driving system of FIG. 1.

FIG. 2A shows the setup signal generated from the setup signal generator 1 indicated in FIG. 1. The setup signal has bipolarity based on a reference point. In FIG. 2A, h1 designates the magnitude of a (+) directional amplitude, w1 the width of a (+) directional pulse, h2 the magnitude of a (−) directional amplitude, w2 the width of a (−) directional pulse, and T a period of the setup signal.

Figure 2B:
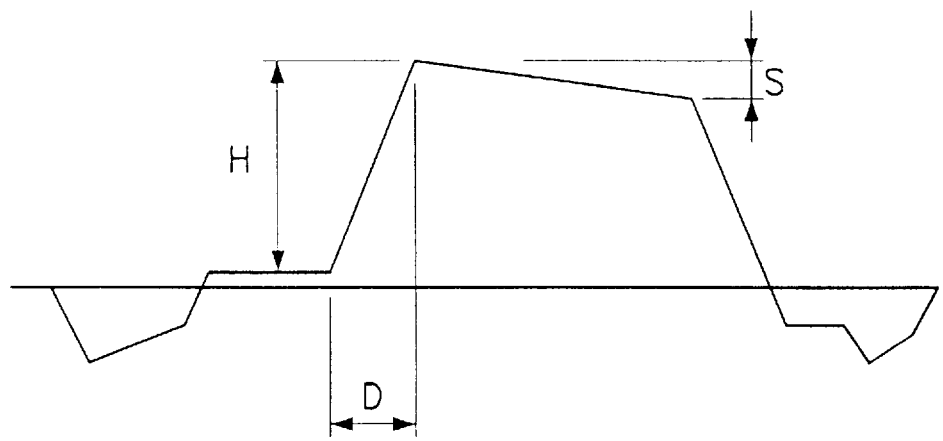
FIG. 2B shows one example of a signal received through a line.

FIG. 2B shows one example of a signal received through a line. H indicates an amplitude of an attenuated state while the setup signal passes through the line toward a (+) directional amplitude, D indicates a rise time generated while the setup signal passes through the line, and S indicates a sag generated while the setup signal passes through the line.

Figure 2C:
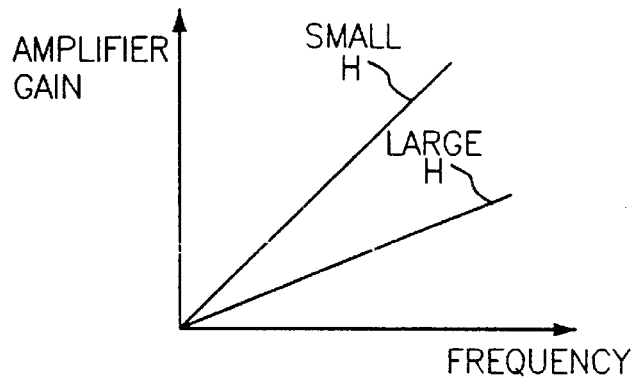
FIG. 2C shows an amplification gain curve of an amplifier and a frequency compensator indicated in FIG. 1 according to H values.
Figure 2D:
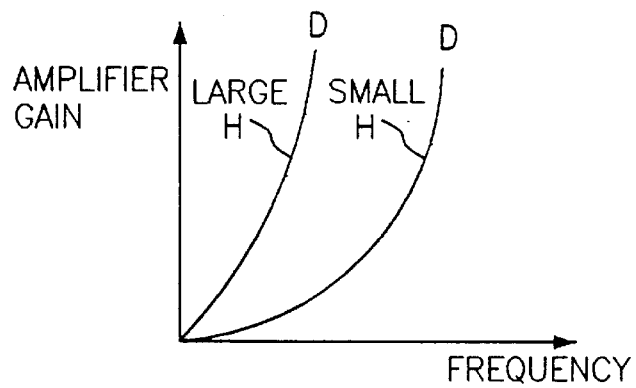
FIG. 2D shows an amplification gain curve of an amplifier and a frequency compensator indicated in FIG. 1 according to D values.
Figure 2E:
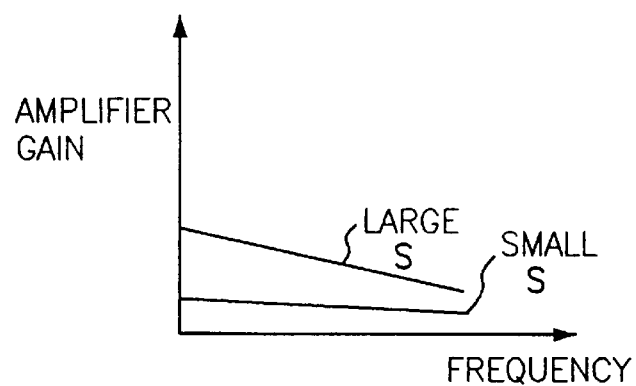
FIG. 2E shows an amplification gain curve of an amplifier and a frequency compensator indicated in FIG. 1 according to S values.

FIGS. 2C–2E show a gain curve of the amplifier 2 and the frequency compensator 3 according to the D, H and S values defined in the clamp/signal detector 6 shown in FIG. 1. FIGS. 2C, 2D and 2E show gain curves for the H, D and S values, respectively. A vertical axis is defined as an amplification gain value, and a horizontal axis is defined as a frequency. There are shown variations in the amplification gain and the frequency when the H. D and S values are small and large.

Figure 3A:
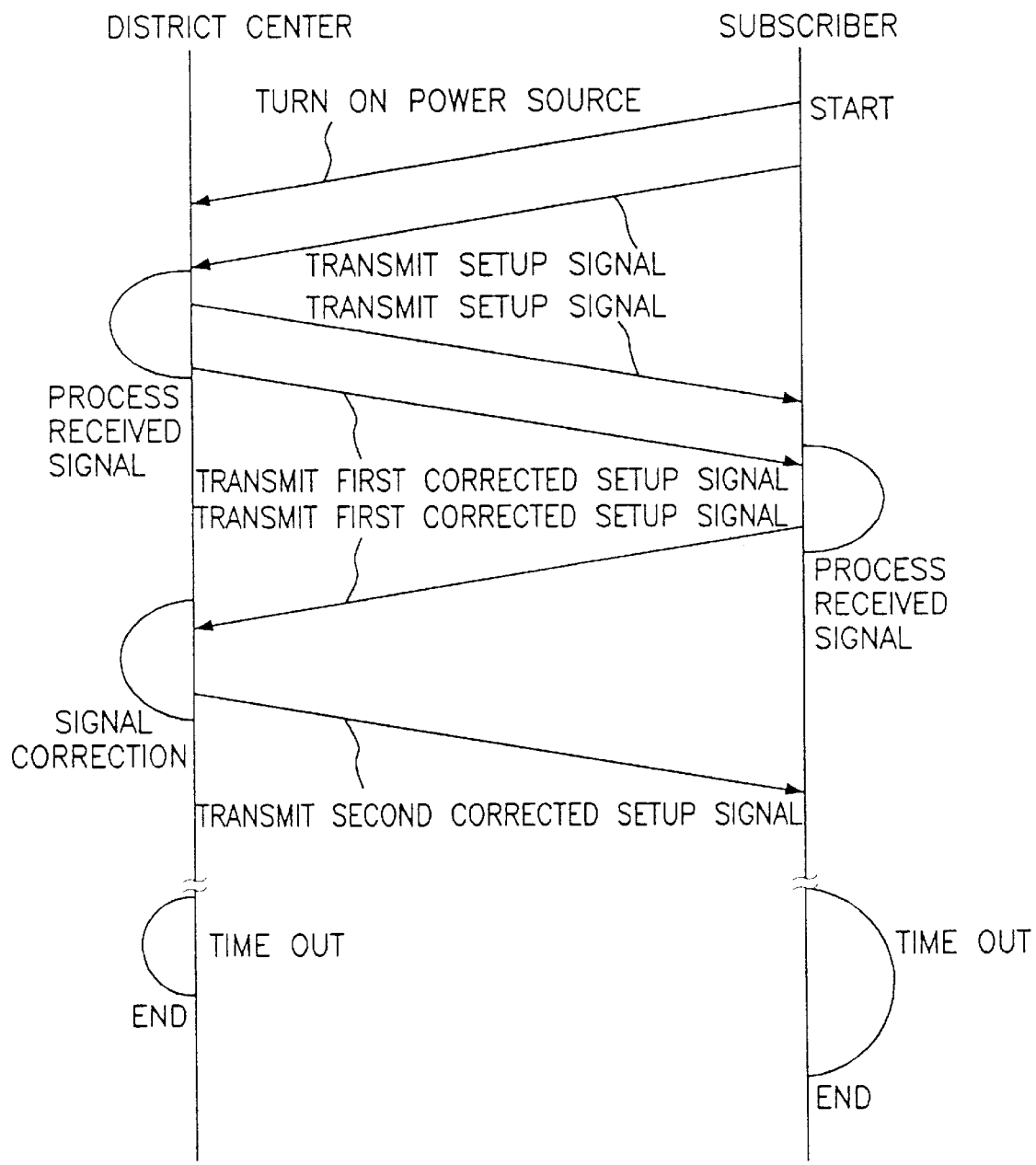
FIG. 3A shows a start procedure from a subscriber terminal.

FIG. 3A shows a start procedure from a subscriber terminal. That is, there is shown a procedure for initially controlling the characteristic of a transmission line when a power source of a subscriber terminal is turned on. The subscriber terminal turns on the power source (step 31), and transmits the setup signal to a district center (step 32). The district center receives the setup signal and simultaneously transmits the setup signal to the subscriber terminal (step 33). The district center corrects the setup signal by controlling the amplifier and the frequency compensator according to the D, H and S values of the received setup signal, and transmits a first corrected setup signal to the subscriber terminal (step 34). Similarly, the subscriber terminal calculates the D, H and S values from the initial setup signal, and determines a control value by accumulating the D, H and S values of the first corrected setup signal. The subscriber terminal corrects the setup signal by this control signal, and transmits a first corrected setup signal to the district center (step 35). The district center receives the first corrected setup signal and calculates the D, H and S values. The district center determines a control signal by accumulating the D, H and S values to the initial value to correct the setup signal, and transmits a second corrected setup signal to the subscriber (step 36). The subscriber terminal calculates the D, H and S values from the second corrected setup signal, and corrects the setup signal by accumulating the D, H and S values. The subscriber terminal transmits a second corrected setup signal to the district center. If the D, H and S values of the second corrected setup signal are within a setting range, the procedure are completed. If not, the procedure is continuously performed. The end of the start procedure is requested by the district center, and the subscriber terminal transmits a request confirmation signal to the district center.

Figure 3B:
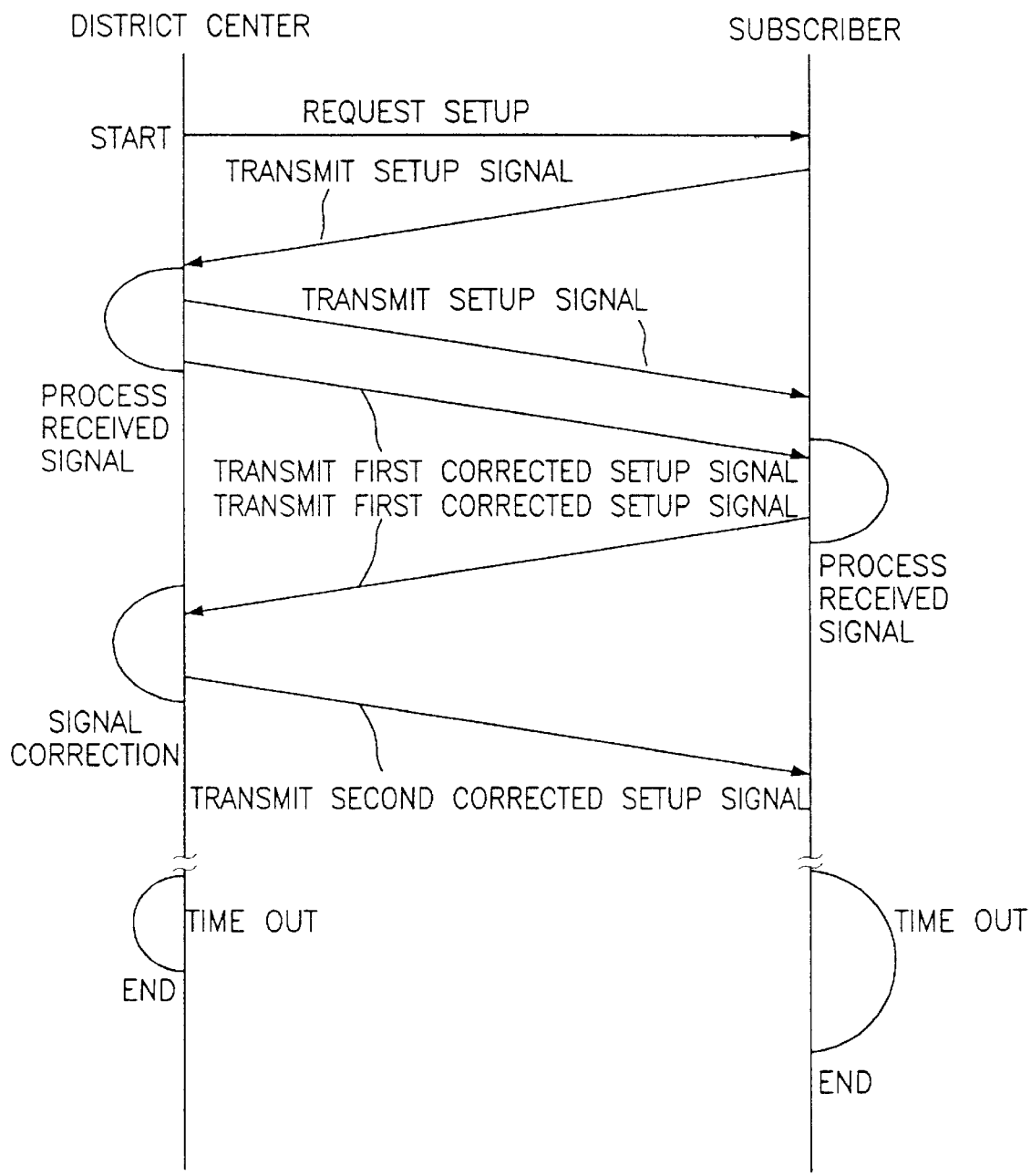
FIG. 3B shows a start procedure from a district center.

FIG. 3B shows the start procedure from the district center. When the performance of the transmission line is deteriorated, the system controller of the district center requests the subscriber terminal to be set up. The start procedure of FIG. 3B is the same as that of FIG. 3A except a request for the setup from the district center instead of turning on the power source from the subscriber terminal.

In transmitting the subscriber transmission signal using the amplifier so as to have a level and a frequency suitable for the characteristic of the transmission line of the subscriber interval, the setup signal is transmitted to judge the characteristic of the transmission line. The setup signal is a clamp pulse with the amplitude h1 and the period T. In consideration of the transmission line of a telephone line, a frequency of the setup signal is set to 4 kHz or more. If the system is installed and is driven, the setup for a set line is performed.

In the symmetrical system construction of the subscriber terminal and the district center, the start procedure from the subscriber terminal will now be described. If the power source of the subscriber terminal is turned on, the setup signal of a specified level is generated in the setup signal generator and transmitted to the district center. The specified level information of the setup signal has already been stored in the district center and the subscriber terminal. In the district center, the setup signal receiver 5 receives the setup signal, and informs the system controller 8 whether the setup signal has been received. Moreover, the setup signal receiver 5 inverts the setup signal, and detects a peak of the inverted setup signal to detect the (−) directional pulse of the setup signal. The setup signal receiver 5 generates a gate pulse separated from this (−) directional pulse of the setup signal by w2 of FIG. 2A, and transmits the gate pulse to the clamp/signal detector 6 together with the original setup signal. The clamp/signal detector 6 receives the clamp pulse and the setup signal, and clamps the setup signal to a reference voltage at a position of the clamp pulse. The clamp/signal detector 6 converts the D, H and S values to a DC voltage, and supplies the converted D, H and S values to the system controller 8 and the combination/discrimination/control generator 7. The combination/discrimination/control generator 7 sums the control signal using the received D, H and S values. If the D value is small, the combination/discrimination/control generator 7 judges that the high frequency characteristic of the line is good, and compensates a high frequency compensation signal so as to have a small value. If the D value is large, the combination/discrimination/control generator 7 generates the control signal for raising a high frequency gain. If the S value is small, the low frequency characteristic of the line is judged to be good. If the S value is large, the combination/discrimination/control generator 7 judges the attenuation of the line is large, and generates the control signal for compensating the attenuation of the line. The H value indicates the attenuation of the entire line. The H value becomes small in proportion to the length of the line. Therefore, the combination/ discrimination/control generator 7 generates the amplifier control signal for raising the amplification gain corresponding to the decreased H value. The amplifier control signal is supplied to the amplifier 2, and the high and low frequency compensation control signals are supplied to the frequency compensator 3. The system controller 8 senses whether the setup signal receiver 5 receives the setup signal according to the start procedure. The system controller 8 controls the combination/discrimination/control generator 7, and bypasses the amplifier 2 and the frequency compensator 3 to generate the setup signal of the specified level. After a given time, the bypass is completed, and the system controller 8 controls the combination/discrimination/control generator 7. The system controller 8 implements the setup procedure until the D, H and S value from the clamp/signal detector 6 are within a specified range. The control signal generated from the system controller 8 is supplied to the combination/ discrimination/control generator 7. This control signal includes start, end and holdover signals of the combination/ discrimination/control generator 7, and an accumulated initial value setting signal of the D, H and S values. The amplification gain is adjusted in the amplifier 2 by use of a voltage value, and a bypass function is implemented by the control signal. The amplifier 2 adds or subtracts the amplification gain of the setup signal generated from the setup signal generator 1 and supplies its output to the frequency compensator 3. The frequency compensator 3 consists of high and low frequency amplifiers, and implements the bypass function according to the control signal. Similarly, the frequency compensator 3 adjusts the amplification gain by the voltage value. The compensated signal of high and low frequencies is supplied to the line connector 4, and the first corrected setup signal is transmitted to the transmission line from the line connector 4.

The subscriber terminal receives the initial setup signal and carries out the above-described functions. However, the D, H and S values detected from the clamp/signal detector 6 are held in the system controller 8, and the setup signal is not transmitted to the district center. If the first corrected setup signal is received, the combination/discrimination/ control generator 7 receives the D, H and S values of the first corrected setup signal, and supplies them to the system controller 8 as an initial value. The system controller 8 accumulates the D, H and S values detected from the first corrected setup signal to the held D, H and S values. If the first corrected setup signal compensated by the accumulated control signal is transmitted to the district center, the district center accumulates the D, H and S values of the received setup signal to the D, H and S values. The combination/ discrimination/control generator 7 supplies the accumulated D, H and S values as the control signal, and the second corrected setup signal compensated by this control signal is transmitted to the subscriber terminal. Through such repeated processes, if the D, H and S values of the signal received from the system controller 8 are within the specified range, the setup procedure is ended. After a given time elapses, the system controller of the district center completes the setup procedure. In the subscriber terminal, the setup procedure is ended after a given time from the reception of the final setup signal.

If the setup procedure is ended, the amplifier 2 changes a channel to a subscriber signal call transmitting channel by the control signal of the system controller 8, and the transmission line which is suitable for the characteristic of the transmission medium is driven. If the transmission characteristic of the subscriber line is deteriorated, the system controller 8 transmits a setup procedure request signal to the subscriber terminal. Then the district center and the subscriber terminal initialize the system, and above-described processes are repeated.

As noted above, the inventive line driving system automatically adjusts an transmission output and a frequency which are suitable for the characteristic of a transmission line of a signal transmitted through a line such as a telephone line or a coaxial cable. Therefore, a transmission distance can be maximized within a given environment by maintaining the optimal transmission performance, and an increase in the electronic wave emission caused by an excessive output can be prevented.

What is claimed is:

1. A line driving system according to the characteristic of a transmission medium, comprising:

setup signal generating means for generating a setup signal;

amplifying means connected to said setup signal generating means, for amplifying an entire frequency band to a constant level, and changing said setup signal and a subscriber transmission signal;

frequency compensating means connected to said amplifying means, for adjusting an amplification gain of a corresponding frequency;

line connecting means connected to said frequency compensating means, for connecting a driving signal to a transmission line medium, said line connecting means being coupled to a cable;

setup signal receiving means for receiving the transmitted setup signal;

clamp/signal detecting means connected to said setup signal receiving means, for detecting a (−) directional pulse signal of said setup signal, generating a signal clamped to a reference point, calculating a value based on a clamp level, and converting said value to a voltage value;

combination/discrimination/control generating means connected to said amplifying means and said frequency compensating means, for generating a control adjusting an ampliation gain according to an output signal generated from said clamp/signal detecting means; and system controlling means connected to said setup signal receiving means and said clamp signal detecting means, for receiving said setup signal from a counterpart, requesting a setup, controlling said combination/discrimination/control generating means, and managing the start and end of a setup procedure.

2. The line driving system as claimed in claim 1, wherein said setup signal is set to have bipolarity of positive polarity and negative polarity, said positive polarity discriminating the characteristic of a line attenuation and a line frequency, and said negative polarity being used to set a clamp position.

3. The line driving system as claimed in claim 2, wherein said characteristic of the line attenuation and the line frequency is discriminated by a first setting value indicating an amplitude of an attenuated state while said setup signal passes through a line toward a (+) directional amplitude, a second setting value indicating a rise time generated while said setup signal passes through the line, and a third setting value indicating a sag generated while said setup signal passes through the line.

* * * * *

UNITED STATES PATENT AND TRADEMARK OFFICE
CERTIFICATE OF CORRECTION

PATENT NO. : 5,818,509
DATED : October 6, 1998
INVENTOR(S) : Kim, et al.

It is certified that error appears in the above-identified patent and that said Letters Patent is hereby corrected as shown below:

On the title page, item [73] Assignee: please insert the second assignee: --Korea Telecommunication Authority, Seoul, Rep. of Korea--.

Signed and Sealed this

Twentieth Day of July, 1999

Attest:

Q. TODD DICKINSON

*Attesting Officer*  *Acting Commissioner of Patents and Trademarks*